March 9, 1937. J. ZENDER 2,072,919
PROCESS FOR PRODUCING CITRIC ACID
Filed April 4, 1935
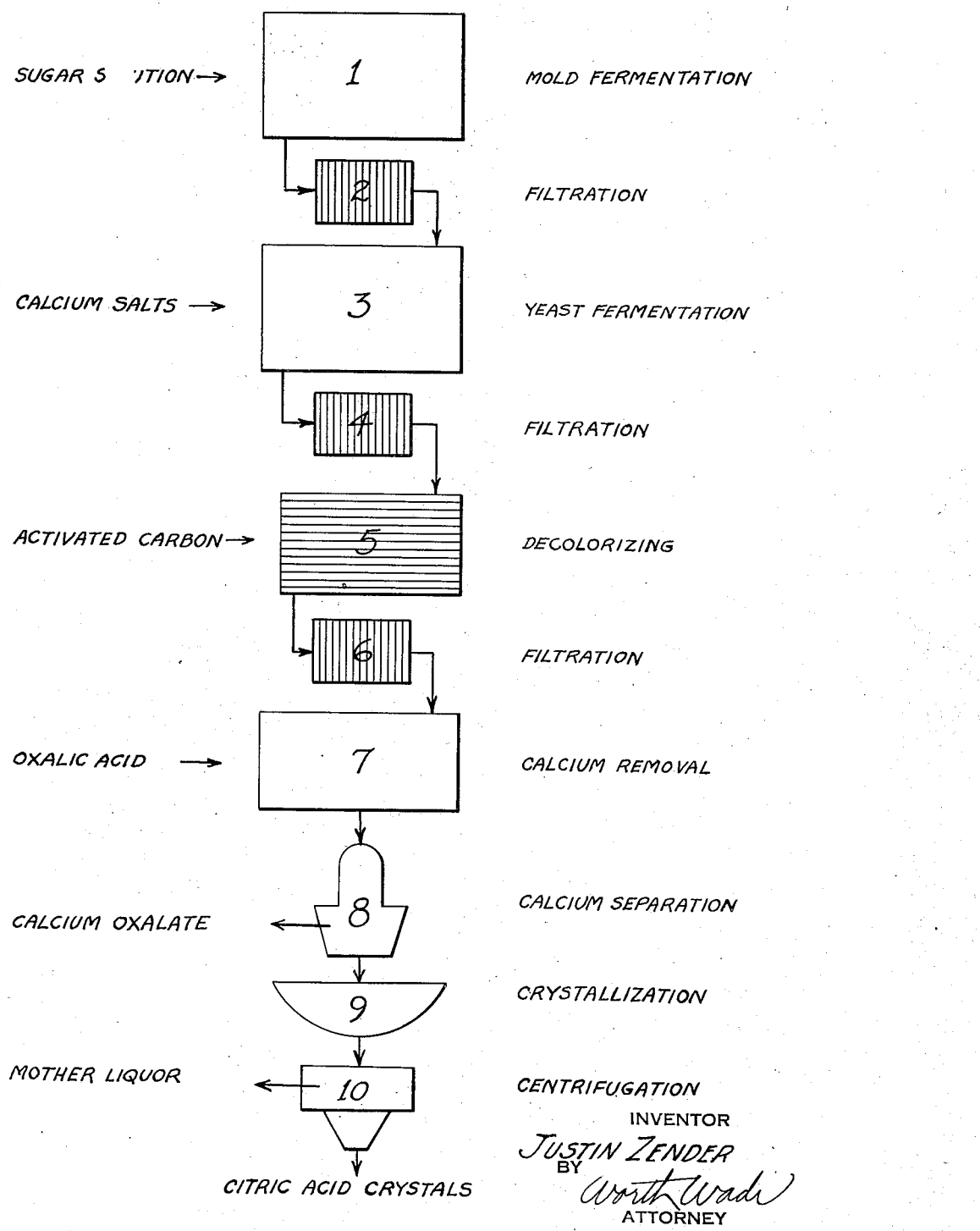

Patented Mar. 9, 1937

2,072,919

UNITED STATES PATENT OFFICE 2,072,919

PROCESS FOR PRODUCING CITRIC ACID

Justin Zender, Ardsley N. Y., assignor to Stauffer Chemical Company, New York, N. Y., a corporation of California Application April 4, 1935, Serial No. 14,549

14 Claims. (Cl. 195—36)

The invention relates in general to the production of citric acid by fermentation and, in particular, to a process for the recovery of citric acid in a crystalline state from mold-fermented solutions.

Heretofore it has been proposed to recover citric acid produced by the mold fermentation of carbohydrate solutions by precipitation with a calcium compound, such as calcium hydroxide followed by the decomposition of the calcium citrate by the use of sulphuric acid which yields a precipitate of calcium sulphate and free citric acid. The commercial success of this prior method has depended more or less upon the market for the by-product calcium sulphate. It has now been found that the crystallization of citric acid from mold fermented solutions of sugar is inhibited by the presence in the solution of residual non-fermented carbohydrates and of colloidal bodies which are by products of the mold fermentation.

It is the general object of the present invention to produce citric acid by mold fermentation of carbohydrates and to recover the citric acid without the production of calcium sulphate as a by-product.

It is a specific object of the invention to provide, in a process for the production of citric acid by mold fermentation of carbohydrates, a method for eliminating the colloids and residual sugar so that the citric acid may be recovered by crystallization.

Other objects of the invention will in part be obvious and will in part appear hereinafter.

According to the invention, citric acid is produced by fermenting a suitable carbohydrate solution with a suitable mold, removing the non-fermented carbohydrate residues and part of the colloids from the mold fermented solution by fermentation with yeast, decolorizing the solution, removing the colloids in the solution by absorption, precipitating the added calcium salt by means of oxalic acid and recovering citric acid from the resulting solution by crystallization.

The invention accordingly comprises a process having the steps and the relation of steps one to another, all as exemplified in the following detailed description and the scope of the application of which will be indicated in the claims.

For a more complete understanding of the nature and objects of the invention, reference should be had to the attached drawing, in which the figure is a diagram of the flow of materials and the combination of steps in the preferred embodiment of the process of the invention.

Referring to the figure, a suitable carbohydrate solution contained in vat 1 is fermented by suitable fungus organisms to citric acid. The resulting solution is then filtered through a filter press 2 and to the filtrate contained in vessel 3 there is added yeast and a small amount of a soluble calcium compound which results in the fermentation of the residual sugar and removal of part of the colloids. The yeast fermented liquid is filtered through the press 4 and the filtrate treated with activated carbon in the vat 5 for the removal of the remaining colloids and coloring matter. The decolorized solution is filtered through the filter press 6 and the filtrate treated with oxalic acid in the vat 7 for the precipitation of the calcium as calcium oxalate. The precipitated calcium oxalate is removed by means of a Sharples separator 8. The citric acid solution is run into the evaporator 9 where the solution is concentrated and then cooled to bring about the crystallization of the citric acid. The crystals of citric acid are separated from the mother liquor by means of a centrifuge 10.

For the raw material, there may be employed any suitable carbohydrates, polysaccharoses and the like. The carbohydrate solution such, for example, as a solution of cane sugar, may be fermented to citric acid by the use of any suitable organisms such, for example, as the genera Aspergillus, Sterigmatocystis, Penicillium, Citromycetes, Mucor, etc. There is added to the carbohydrate solution suitable nutrient salts which are necessary for the growth of the fungi. For example, to each 1000 cc. of a 15% cane sugar solution there may be added ammonium nitrate from 2 to 2.5 grams or an equivalent amount of urea, potassium dihydrogen phosphate from 0.75 to 1 gram, magnesium sulphate (hydrated) from 0.2 to .25 of a gram. The solution is acidified with hydrochloric acid or citric acid until the pH is about 3.4. The solution is fermented at a temperature of from 26°–35° C. the temperature depending upon the particular fungi used.

The mold fermented solution is then filtered to separate the citric acid solution from the mold growth. The filtrate contains from about 12% to 15% of citric acid and from 3.5% to 5% of residual sugar, as well as certain coloring matters and a considerable amount of colloids derived from the mold fermentation process.

The mold fermented solution has a pH of less than 1 and is, therefore, too acid for yeast fermentation. However, it has now been found that it is not necessary to adjust the pH 4.5 or higher to bring about the yeast fermentation of the residual sugar if a fermentation catalyst is present in the solution. I have discovered that the yeast fermentation proceeds satisfactorily and, even in highly acid solutions, if there is present a small proportion of from 0.1% to 1% of a soluble calcium compound which acts as a catalyst. The calcium compound to be used is preferably basic or neutral in reaction such, for example, as calcium hydroxide, calcium phosphate, calcium acetate, calcium ammonium phosphate and the like. For the proper growth of yeast, there is also added a known mixture of nutrient salts. For example, to each 1000 cc. of the fermented citric acid solution, there may be added the following solids:

| | Grams |
|---|---|
| Ammonium nitrate | 2.5 |
| Potassium dihydrogen phosphate | 1 |
| Calcium hydroxide | 5 |

Yeast is added to the resulting solution and the sugar contained therein may be fermented to alcohol in a known manner in from 40 to 48 hours. When the yeast fermentation is complete, the solution has a density of 1.052% at 20° C. and a sugar content of less than 0.5%.

The yeast fermented solution is filtered to separate out the yeast and the filtrate treated for the removal of the remaining colloids and coloring matter contained therein. For this purpose, the filtrate may be passed through a mass of activated carbon which absorbs the remaining colloids and decolorizes the solution. Alternatively, a quantity of activated carbon such as 0.5 parts, may be stirred into 100 parts of the solution and the solution left standing for one hour. The decolorized solution is then filtered, if necessary, to remove any particles of carbon and foreign matter.

The calcium salt which was added to catalyze the yeast fermentation is now removed preferably by treating the decolorized solution with oxalic acid or a soluble oxalate such, for example, as an alkali metal salt of oxalic acid, ammonium oxalate and the like. For example, oxalic acid may be added to the solution at ordinary temperature to precipitate the calcium oxalate and the resulting liquid centrifuged. Alternatively, and preferably, the oxalic acid is added at an elevated temperature such, for example, as a temperature of 70° C. or above with vigorous stirring. At this temperature, the calcium oxalate which is formed, can be easily removed, for example, by passing the solution through a Sharples separator as indicated in the flow diagram. If desired, the oxalic acid may be recovered from the calcium oxalate by treating the latter with sulphuric acid.

The citric acid liquor is now ready for the final step of crystallization. The solution is evaporated by any suitable method until the specific gravity has increased to 22° Baumé at which concentration the last traces of the calcium oxalate separate from the solution. The supernatant liquid is then filtered and further evaporated to a specific gravity of 39° Baumé or higher. The concentrated solution is then cooled whereupon the crystals of citric acid begin to form. After a suitable time interval such as three days, the mother liquor is run off and the crystals may be redissolved, recrystallized and then separated from the mother liquor by centrifugation as indicated in the flow diagram. The first mother liquor obtained from the crystallization is returned to the yeast fermentation tank for refermentation, but the subsequent mother liquors from the centrifuge preferably are run back into the evaporator.

I claim:
1. A process for producing citric acid comprising mold-fermenting a solution of a carbohydrate to citric acid, yeast-fermenting the residual carbohydrate in the presence of a catalyst comprising a soluble calcium compound, removing calcium from said solution, and recovering the citric acid by crystallization.

2. A process for producing citric acid comprising mold-fermenting a solution of a carbohydrate to citric acid, adding to the citric acid solution a soluble calcium compound, yeast-fermenting the resulting solution, removing calcium from said solution, and recovering the citric acid by crystallization.

3. A process for producing citric acid comprising mold-fermenting a solution of a carbohydrate to citric acid, yeast-fermenting the residual carbohydrate in the presence of a catalyst comprising a soluble calcium compound, removing colloids from said solution by absorption, removing calcium from said solution, and recovering the citric acid by crystallization.

4. A process for producing citric acid comprising mold-fermenting a solution of a carbohydrate to citric acid, removing the residual carbohydrate and part of the colloids from said solution by yeast-fermenting in the presence of a catalyst comprising a calcium compound, removing the remaining colloids and the coloring matter from the yeast-fermented solution by contacting said solution with activated carbon, and recovering the citric acid from the resulting solution by crystallization.

5. A process for producing citric acid comprising mold-fermenting a solution of a carbohydrate to citric acid, filtering the solution, adding to the filtrate a soluble calcium compound, yeast-fermenting the resulting solution to remove the residual sugar and part of the colloids contained therein, filtering the yeast-fermented solution and contacting the filtrate with activated carbon to remove the remaining colloids and the coloring matter from said solution, adding to the decolorized solution oxalic acid to precipitate calcium oxalate, and recovering the citric acid from the resulting solution by crystallization.

6. A process for producing citric acid comprising mold-fermenting a solution of a carbohydrate to citric acid, filtering the solution, adding to the filtrate from $\frac{1}{10}$% to 1% of a soluble calcium compound, yeast-fermenting the resulting solution to remove the residual sugar and part of the colloids contained therein, filtering the yeast-fermented solution and contacting the filtrate with activated carbon to remove the remaining colloids and the coloring matter from said solution, adding to the decolorized solution oxalic acid in an amount sufficient to precipitate calcium oxalate, and recovering the citric acid from the resulting solution by crystallization.

7. A process for producing citric acid comprising mold-fermenting a solution of a carbohydrate to citric acid, filtering the solution, adding to the filtrate a soluble calcium compound, yeast-fermenting the resulting solution to remove the residual sugar and part of the colloids contained therein, filtering the yeast-fermented solution and contacting the filtrate with activated carbon to remove the remaining colloids and the coloring matter from said solution, precipitating the calcium as calcium oxalate by adding to said solution oxalic acid at an elevated temperature, removing the precipitate of calcium oxalate, and recovering the citric acid from the resulting solution by crystallization.

8. In a process for producing crystalline citric acid from mold-fermented carbohydrate solutions, the steps comprising removing the residual carbohydrate and part of the colloids by yeast-fermenting a mold-fermented carbohydrate solution in the presence of a catalyst comprising a calcium compound, removing the remaining colloids and the coloring matter from the yeast-fermented solution by contacting said solution with activated carbon, removing calcium from said solution, and recovering the citric acid from the resulting solution by crystallization.

9. In a process for producing crystalline citric acid from mold-fermented carbohydrate solutions, the steps comprising adding a soluble calcium compound to a mold-fermented carbohydrate solution, yeast-fermenting the resulting solution to remove the residual carbohydrate and part of the colloids contained therein, filtering the yeast-fermented solution and contacting the filtrate with activated carbon to remove the remaining colloids and the coloring matter from said solution, adding to the decolorized solution oxalic acid to precipitate calcium oxalate, and recovering the citric acid from the resulting solution by crystallization.

10. In a process for producing crystalline citric acid from mold-fermented carbohydrate solutions, the steps comprising adding to the citric acid solution from $\frac{1}{10}\%$ to 1% of a soluble calcium compound, yeast-fermenting the resulting solution to remove the residual carbohydrate and part of the colloids contained therein, filtering the yeast-fermented solution and contacting the filtrate with activated carbon to remove the remaining colloids and the coloring matter from said solution, adding to the decolorized solution oxalic acid in an amount sufficient to precipitate calcium oxalate, and recovering the citric acid from the resulting solution by crystallization.

11. In a process for producing crystalline citric acid from mold-fermented carbohydrate solutions, the steps comprising filtering the citric acid solution, adding to the filtrate a soluble calcium compound, yeast-fermenting the resulting solution to remove the residual carbohydrate and part of the colloids contained therein, filtering the yeast-fermented solution and contacting the filtrate with activated carbon to remove the remaining colloids and the coloring matter from said solution, precipitating the calcium as calcium oxalate by adding to said solution oxalic acid at an elevated temperature, removing the precipitate of calcium oxalate, and recovering the citric acid from the resulting solution by crystallization.

12. A process for producing citric acid comprising mold-fermenting a solution of a carbohydrate until the solution contains from about 12% to 15% of citric acid, adding to the mold-fermented solution a soluble calcium compound, yeast-fermenting the resulting solution, removing calcium from said solution and recovering the citric acid by crystallization.

13. A process for producing citric acid comprising mold-fermenting a solution of a carbohydrate until the solution contains from about 12% to 15% of citric acid, adding to the mold fermented solution from 0.1% to 1% of a soluble calcium compound, yeast-fermenting the resulting solution, removing calcium from said solution and recovering the citric acid by crystallization.

14. A process for producing citric acid comprising mold-fermenting a solution of a carbohydrate until the solution contains from about 12% to 15% of citric acid, filtering the solution, adding to the filtrate from 0.1% to 1% of a soluble calcium compound, yeast fermenting the resulting solution to remove the residual sugar and part of the colloids contained therein, filtering the yeast-fermented solution and contacting the filtrate with activated carbon to remove the remaining colloids and the coloring matter from said solution, adding to the decolorized solution oxalic acid in an amount sufficient to precipitate calcium oxalate, and recovering the citric acid from the resulting solution by crystallization.

JUSTIN ZENDER.